United States Patent [19]
Kuo

[11] Patent Number: 6,007,032
[45] Date of Patent: Dec. 28, 1999

[54] FOLDABLE STAND ASSEMBLY FOR MICROPHONES

[76] Inventor: Hua Tsung Kuo, No. 450, Sec. 3, Cheng Hsi St., Tainan City, Taiwan

[21] Appl. No.: 09/159,540

[22] Filed: Sep. 24, 1998

[51] Int. Cl.⁶ .................................................. F16M 11/10
[52] U.S. Cl. ..................... 248/185.1; 248/125.1; 248/161; 248/168; 248/178.1; 248/188.7; 248/405; 403/102
[58] Field of Search ........................ 248/185.1, 5, 154, 248/382, 125.1, 125.2, 125.3, 125.8, 161, 405, 188.7, 168, 169; 403/102, 100; 285/184

[56] References Cited

U.S. PATENT DOCUMENTS

| D. 286,478 | 11/1986 | Oakes, Jr. | D6/419 |
|---|---|---|---|
| 1,881,990 | 10/1932 | Zitzer | 403/92 |
| 1,894,695 | 1/1933 | Levy | 248/171 |
| 2,066,182 | 12/1936 | Lenz | 227/46 |
| 2,107,124 | 2/1938 | Markert | 248/185 |
| 2,502,667 | 4/1950 | Pagett | 248/176 |
| 3,488,068 | 1/1970 | De Voe | 285/61 |
| 3,856,253 | 12/1974 | Seebinger | 248/411 |
| 4,671,479 | 6/1987 | Johnson et al. | 248/173 |
| 5,011,104 | 4/1991 | Fang | 248/125 |
| 5,048,789 | 9/1991 | Eason et al. | 248/544 |
| 5,340,066 | 8/1994 | Ditch | 248/170 |
| 5,632,459 | 5/1997 | Brett | 248/122.1 |
| 5,692,719 | 12/1997 | Shepherd | 248/460 |
| 5,713,553 | 2/1998 | Cooper | 248/461 |
| 5,934,628 | 8/1999 | Bosnakovic | 248/177.1 |

*Primary Examiner*—Leslie A. Braun
*Assistant Examiner*—Debbie Short
*Attorney, Agent, or Firm*—Charles E. Baxley, Esq.

[57] ABSTRACT

A microphone stand assembly includes a leg base that has a number of legs each having an end pivotally connected to a lower end thereof. A post includes a lower tube having a lower end connected to the leg base, an upper tube slidably received in the lower tube, and a first clamping sleeve for holding the upper tube in place relative to the lower tube. A pivotal base includes a seat secured to an upper end of the upper tube and including a first through hole therein. The pivotal base further includes a connecting block including a section pivotally connected to the seat and a second through hole defined therein. A holder rod is slidably extended through the first through hole, the second through hole, and the upper tube. The holder rod is removable from the first through hole and the upper tube. A second clamping sleeve is provided to hold the holder rod in place relative to the upper end of the connecting block. A microphone holder is secured to the upper end of the holder rod.

13 Claims, 8 Drawing Sheets

FOLDABLE STAND ASSEMBLY FOR MICROPHONES

BACKGROUND OF THE INVENTION

1. Field of the Invention

The present invention relates to a foldable stand assembly for microphones.

2. Description of the Related Art

FIG. 8 of the drawings illustrates a conventional stand assembly for microphones. The stand assembly includes a base 1', a post 2', a rotational seat 3', an inclined rod 4', and a microphone holder 5. The base 1' includes a main body 11' having a central hole 111' for receiving a lower end of the post 2'. A retaining screw 113' is extended through a transverse hole 112' defined in an upper end of the main body 11' to retain the lower end of the post 2' in position. The main body 11' further includes three openings 144' defined in a lower end thereof Three legs 12' are mounted to the main body 11' by means of extending bolts 115' through aligned holes 116' defined in the lower end of the main body 11' and a hole 117' in an end 121' of each leg 12'.

The post 2' includes a lower tube 21' and an upper tube 22' connected by a clamping sleeve 23'. The upper tube 22' is telescopically received in the lower tube 21' to allow adjustment of the overall height of the lower tube 21' and the upper tube 22'. After adjustment of the overall height, the upper tube 21' is positioned by rotating the clamping ring 23'. The rotating seat 3' includes two discs 31' and 32' and a pad 33'. The disc 31' has a rod 314' attached to a side thereof. The rod 314' has a transverse hole 311' through which an upper end of the upper section 22' of the post 2' is extended, and a retaining screw 312' is extended through an axial screw hole 313' of the rod 314' to retain the rod 314' in position. The disc 32' includes a groove 323' defined in a side thereof that faces the pad 33'. The groove 323' may hold a portion of the inclined rod 4'. A retaining screw 321' is extended through a hole 322' of the disc 32', a hole 331' of the pad 33, and engaged with the screw hole 313' of the disc 31' to retain the inclined rod 4 in position after completion of adjustment of inclination angle of the inclined rod 4. The microphone holder 5' is mounted to an upper end of the inclined rod 4' for holding a microphone (not shown).

In use, the microphone stand assembly can be assembled to a status shown in FIG. 9. Yet, the microphone stand assembly can be folded to a status shown in FIG. 10 when not in use. A drawback of such a stand assembly resides in that the inclined rod 4' is located on a side of the post 2' and thus causes a deviation of center of gravity, i.e., the stability of the post 2' is adversely affected. A further drawback of the conventional stand assembly resides in that the inclined rod 4' is exposed and thus occupies a larger space and results in an unaesthetic appearance. In addition, the engagement between the seat 1' and the post 2' is not reliable as it uses a retaining screw 113'. Furthermore, the retaining screws 113', 312', and 321' are all exposed and thus might adversely affect the vision effect on a stage.

The present invention is intended to provide an improved foldable microphone stand assembly to solve the above problems.

SUMMARY OF THE INVENTION

It is a primary object of the present invention to provide a microphone stand assembly in which the holder rod for holding the microphone is directly mounted above the post and thus provides a more stable structure.

It is another object of the present invention to provide a microphone stand assembly that provides an aesthetic appearance when folded.

In accordance with one aspect of the invention, a microphone stand assembly comprises:

a leg base including a lower end and an upper end, a plurality of legs each having an end connected to the lower end of the leg base, a post including a lower tube having a lower end connected to the leg base, an upper tube slidably received in the lower tube, and a first clamping sleeve for holding the upper tube in place relative to the lower tube, the upper tube having an upper end, a pivotal base including:
  a seat secured to the upper end of the upper tube and including a first through hole therein, and
  a connecting block including a section pivotally connected to the seat, a second through hole, and an upper end, a holder rod slidably extended through the first through hole, the second through hole, and the upper tube, the holder rod being removable from the first through hole and the upper tube, and a second clamping sleeve being provided to hold the holder rod in place relative to the upper end of the connecting block, the holder rod further including an upper end, and a microphone holder secured to the upper end of the holder rod.

The leg base includes a plurality of channels defined in an outer periphery thereof, and each leg is pivotally connected to the leg base and is releasably retained in an associated channel when in a folded status. Each channel includes a narrowed section for holding an associated leg. The lower tube of the post may include a supporter at the lower end thereof, and the end of each leg that is pivotally connected to the leg base rests on the supporter to improve stability.

In a preferred embodiment of the invention, the leg base includes a connecting seat and an engaging sleeve mounted around the connecting seat. The connecting seat has a guiding groove defined in an outer periphery thereof The engaging sleeve includes a central hole and a plurality of channels defined in an outer periphery thereof An inner periphery that defines the central hole of the engaging sleeve includes a vertical groove defined therein. The lower tube includes a transverse screw hole defined in a lower end thereof A positioning bolt is extended through the transverse screw hole and slidably guided in the guiding groove.

An actuating member is slidably received in the vertical groove of the engaging sleeve. The actuating member includes a top end extended beyond the vertical groove for manual push. The actuating member further includes a first engaging section and a second engaging section. The positioning bolt is engaged with the first engaging section when the legs are in an extended status. The positioning bolt is engaged with the second engaging section when the legs are in a folded status in which each said leg is retained in an associated said channel.

Each of the first engaging section and the second engaging section of the actuating member includes a notch for releasably engaging with the positioning bolt. In addition, each of the first engaging section and the second engaging section of the actuating member further includes a slanted surface adjacent to the notch for guiding the positioning bolt into the notch.

In accordance with a second aspect of the invention, a microphone stand assembly comprises:

a leg base including a connecting seat, an engaging sleeve mounted around the connecting seat, and a plurality of legs each having an end pivotally connected to the connecting seat, the connecting seat having a guiding groove defined in an outer periphery thereof the engaging sleeve including a central hole and a plurality of channels defined in an outer periphery thereof, an inner periphery that defines the central hole of the engaging sleeve including a vertical groove defined therein, and further comprising an actuating member slidably received in the vertical groove of the engaging sleeve, the actuating member including a top end extended beyond the vertical groove for manual push, the actuating member further including a first engaging section and a second engaging section, a post including a lower tube having a lower end received in the connecting seat of the leg base, an upper tube slidably received in the lower tube, and a first clamping sleeve for holding the upper tube in place relative to the lower tube, the upper tube having an upper end, the lower tube including a transverse screw hole defined in the lower end thereof, and further comprising a positioning bolt extended through the transverse screw hole and slidably guided in the guiding groove, wherein the positioning bolt is engaged with the first engaging section when the legs are in an extended status, and wherein the positioning bolt is engaged with the second engaging section when the legs are in a folded status, a holder rod attached to the upper end of the upper tube, and a microphone holder secured to the upper end of the holder rod.

In accordance with a third aspect of the invention, a microphone stand assembly comprises:

a leg base including a lower end and an upper end, a plurality of legs each having an end connected to the lower end of the leg base, a post including a lower end connected to the leg base and an upper end a pivotal base including:
   a seat secured to the upper end of the post and including a first through hole therein, and
   a connecting block including a section pivotally connected to the seat, a second through hole, and an upper end, a holder rod slidably extended through the first through hole, the second through hole, and the post, the holder rod being removable from the first through hole and the upper tube, and a clamping sleeve being provided to hold the holder rod in place relative to the upper end of the connecting block, the holder rod further including an upper end, and a microphone holder secured to the upper end of the holder rod.

Other objects, advantages, and novel features of the invention will become more apparent from the following detailed description when taken in conjunction with the accompanying drawings

DETAILED DESCRIPTION OF THE PREFERRED EMBODIMENT

Figure 1:
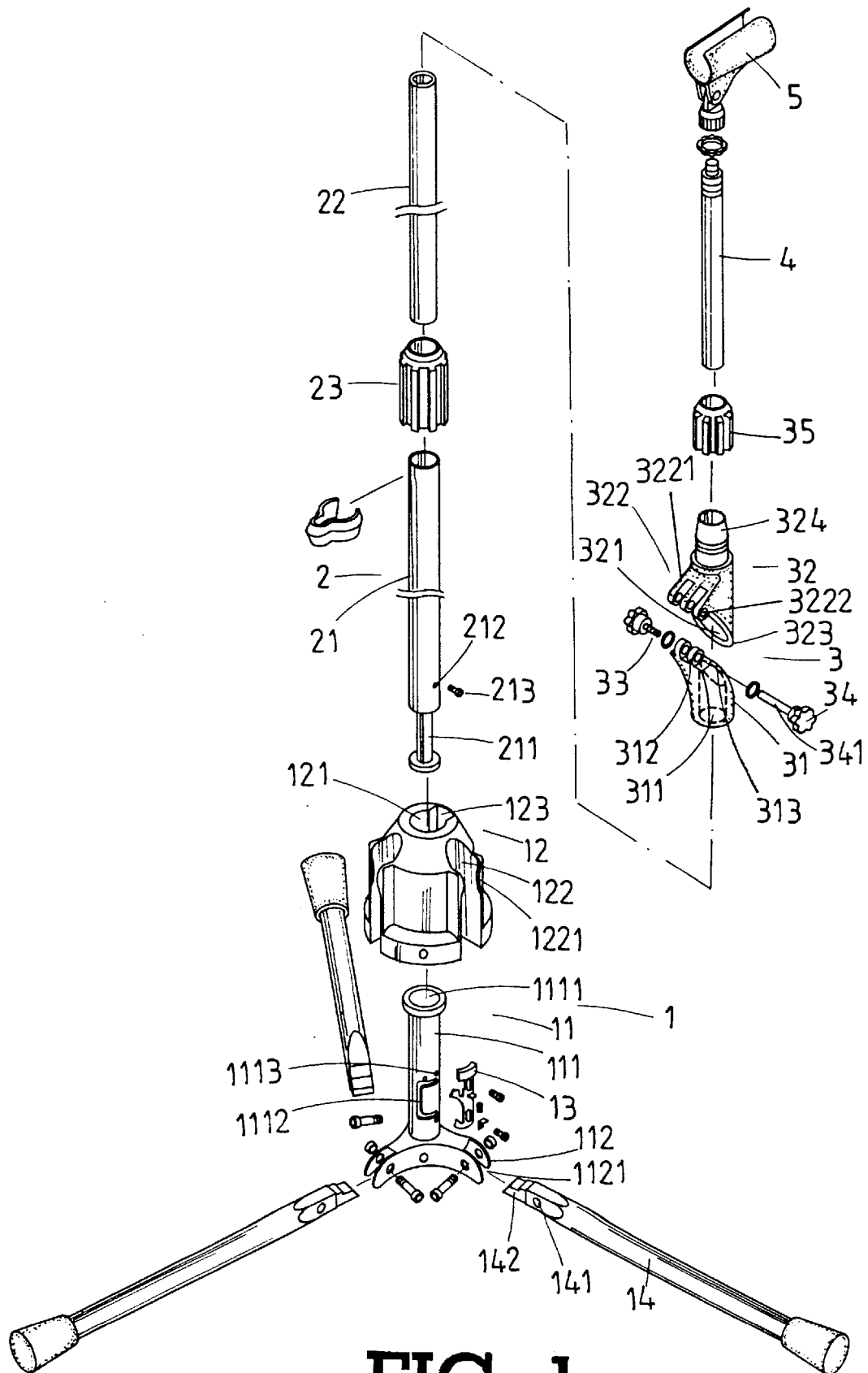
FIG. 1 is an exploded perspective view of a microphone stand assembly in accordance with the present invention.
Figure 2:
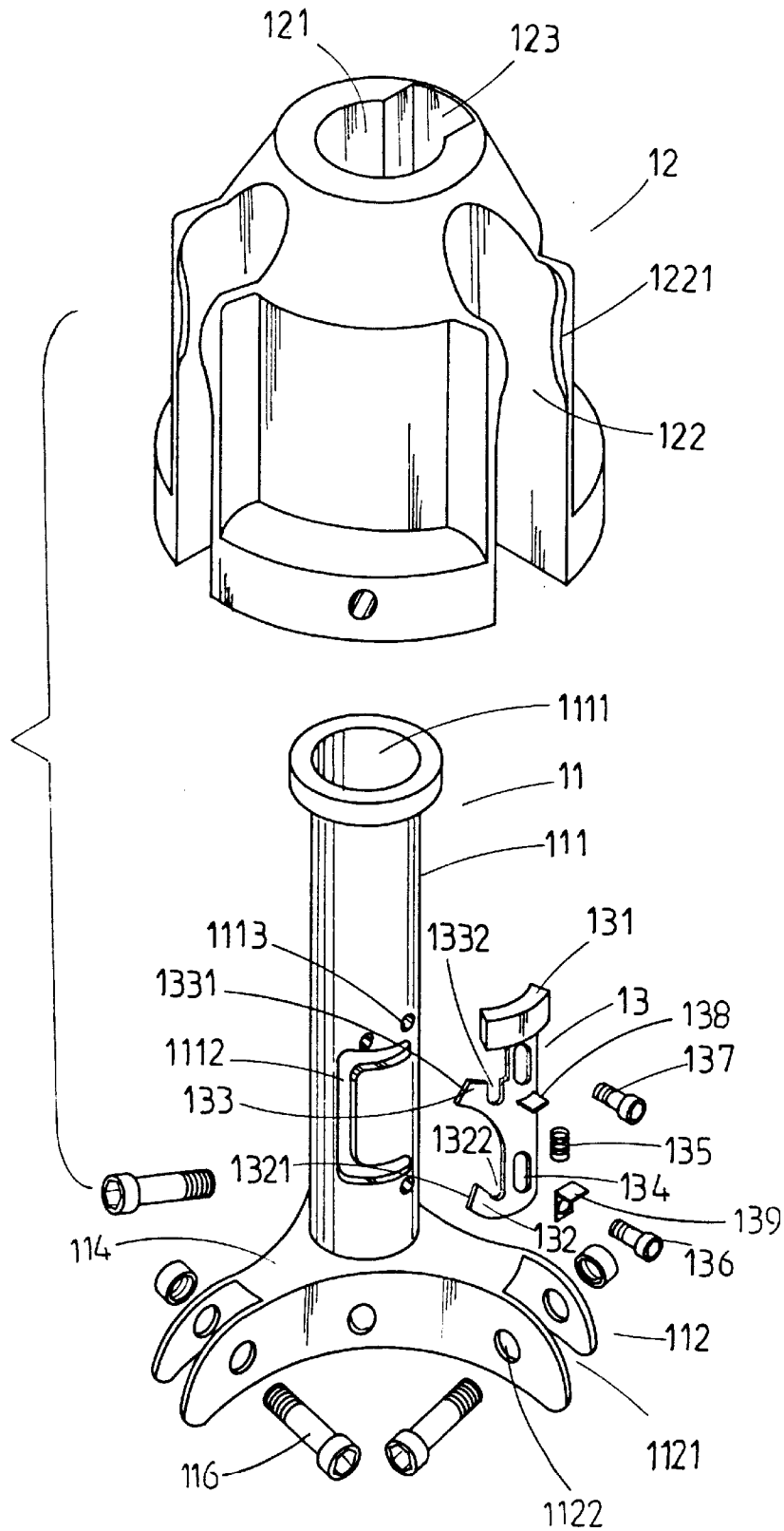
FIG. 2 is an exploded perspective view of a leg base of the microphone stand assembly in accordance with the present invention.

Referring to FIGS. 1 to 7 and initially to FIG. 1, a microphone stand assembly in accordance with the present invention generally includes a leg base 1, a post 2, a pivotal base 3, a holder rod 4, and a microphone holder 5. Referring to FIGS. 1 and 2, the leg base 1 includes a connecting seat 11 and an engaging sleeve 12 mounted round the connecting seat 11. The connecting seat 11 includes a number of branches 114 (e.g., three branches) extending radially outwards from a lower end thereof, each branch 114 having a pair of spaced lateral walls 112 that have a space 1121 defined therebetween. A number of legs 14 (e.g., three legs) are pivotally attached to the branches 114, respectively. In this embodiment, a pin 116 is extended through aligned holes 1122 (FIG. 2) defined in the lateral walls 112 and a hole 141 (FIG. 1) defined in an end 142 of an associated leg 14. The connecting seat 11 further includes a guiding groove 1112 defined in an outer periphery 111 thereof and a central hole 1111 defined therein. The guiding groove 1112 is preferably U-shaped and includes two ends for positioning the post 2.

Still referring to FIGS. 1 and 2, the engaging sleeve 12 includes a central hole 121 and a number of channels 122 (e.g., three channels) defined in an outer periphery thereof Each channel 122 having a narrowed section 1221 for retaining an associated leg 14 when folded. In addition, the engaging sleeve 12 includes a vertical groove 123 defined in a periphery that defines the central hole 121.

An actuating member 13 is partially, slidably received in the vertical groove 123 and includes a top end 131 for push. The actuating member 13 further includes a first engaging section 132 and a second engaging section 133 cooperating with the guiding groove 1112. Each engaging section 132, 133 includes a slanted surface 1321, 1331. The actuating member 13 further includes a notch 1322, 1332 adjacent to the associated slanted surface 1321, 1331 for cooperating a positioning bolt 213, which will be described later. The actuating member 13 further includes two slots 134 defined in a mediate end thereof for cooperating with positioning holes 1113 in the connecting seat 11, respectively. A bolt 136, 137 is extended through each slot 134 and the associated hole 1113 to thereby allow vertical sliding movements of the actuating member 13 relative to the connecting seat 11. An upper tab 138 is formed on the mediate section of the actuating member 13 and a lower tab 139 is secured to the lower bolt 136. A spring 35 is attached between the upper tab 138 and the lower tab 139 to position the positioning bolt 213, which will be described later.

Figure 4:
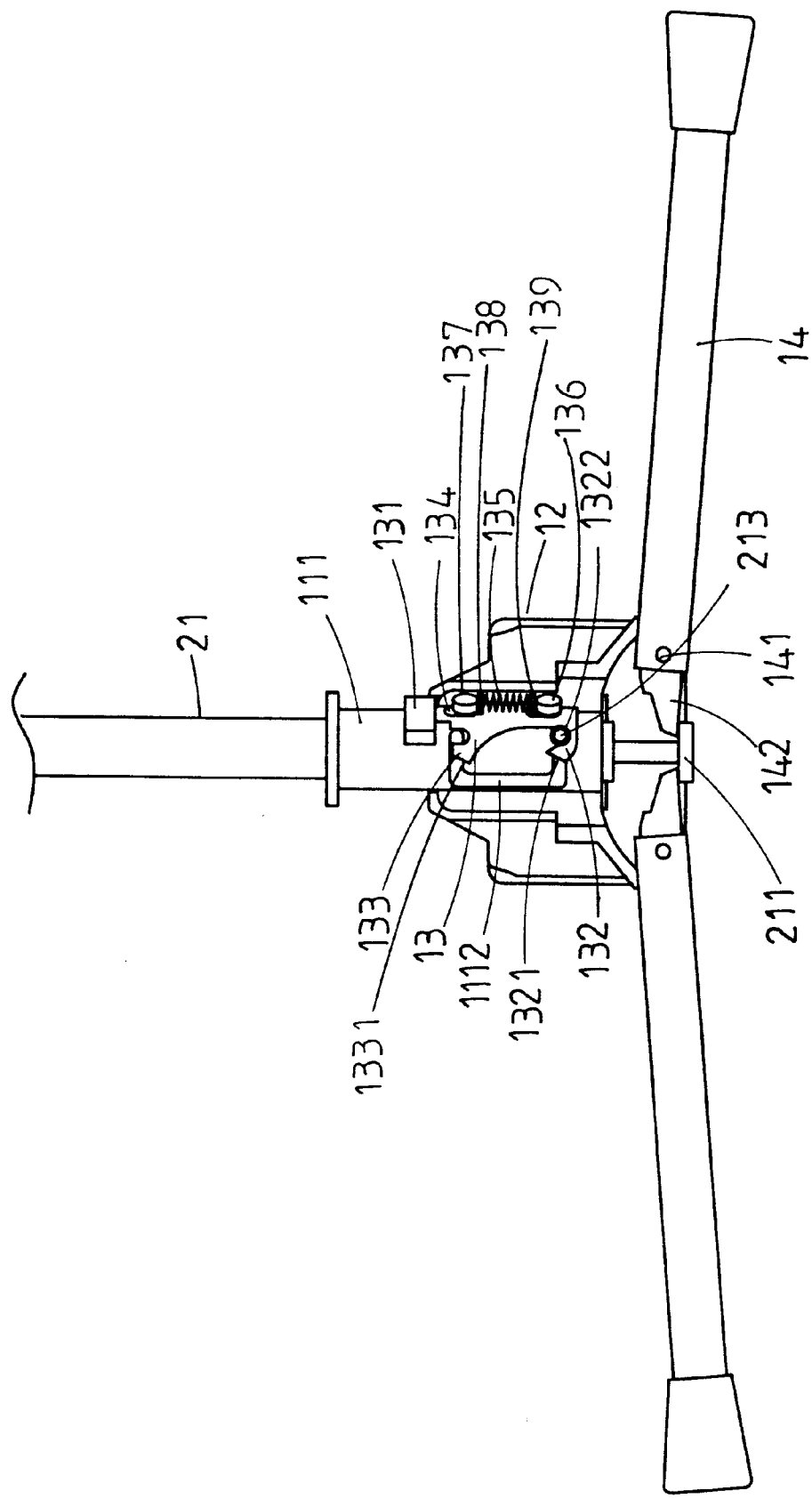
FIG. 4 is a side view of the leg base in an extended status.

Referring to FIG. 1, the post 2 includes a lower tube 21 and an upper tube 22 slidably received in the lower tube 21, and a clamping sleeve 23 is provided to hold the upper tube 22 in place relative to the lower tube 21. As shown in FIG. 1, the lower tube 21 includes a supporter 211 formed on a bottom end thereof As shown in FIG. 4, the end 142 of each leg 14 rests on the supporter 211 on the lower end of the post 2 to improve stability. The lower tube 21 further includes a transverse screw hole 212 defined in a periphery thereof for threadedly engaging with the above-mentioned positioning bolt 213.

Still referring to FIG. 1, the pivotal seat 3 includes a seat 31, a connecting block 32, a pin 33, a knob 34, and a clamping sleeve 35. The seat 31 is secured to an upper end of the upper tube 22 and includes two spaced lugs 312 formed thereon and having aligned holes 311. The seat 31 further includes an inclined surface 313 formed on the upper end thereof The connecting block 32 includes a lower inclined surface 323 for fittingly engaging with the inclined surface 313 of the seat 31, a connecting section 322 formed on an outer periphery thereof and including spaced lugs 3221 with aligned holes 3222, and a through hole 321. The connecting block 32 further includes an upper end 324 for receiving a lower end of the holder rod 4, and the clamping sleeve 35 is provided to hold the holder rod 4 in place relative to the connecting block 32. The lugs 312 is received in spaces defined between the lugs 3221 of the connecting block 32, and the knob 34 has a stem 341 extended through the aligned holes 3222 of the lugs 3221, and the pin 33 is inserted into a screw hole (not shown) defined in the stem 341 of the knob 34 to thereby retain the connecting block 32 in a selected fixed position relative to the seat 31. The microphone holder 5 is secured to an upper end of the holder rod 4 for holding a microphone. A diameter of the holder rod 4 is smaller than the inner diameter of the upper tube 22 and thus can be slidably extended through the holes 321 and 311.

Figure 3:
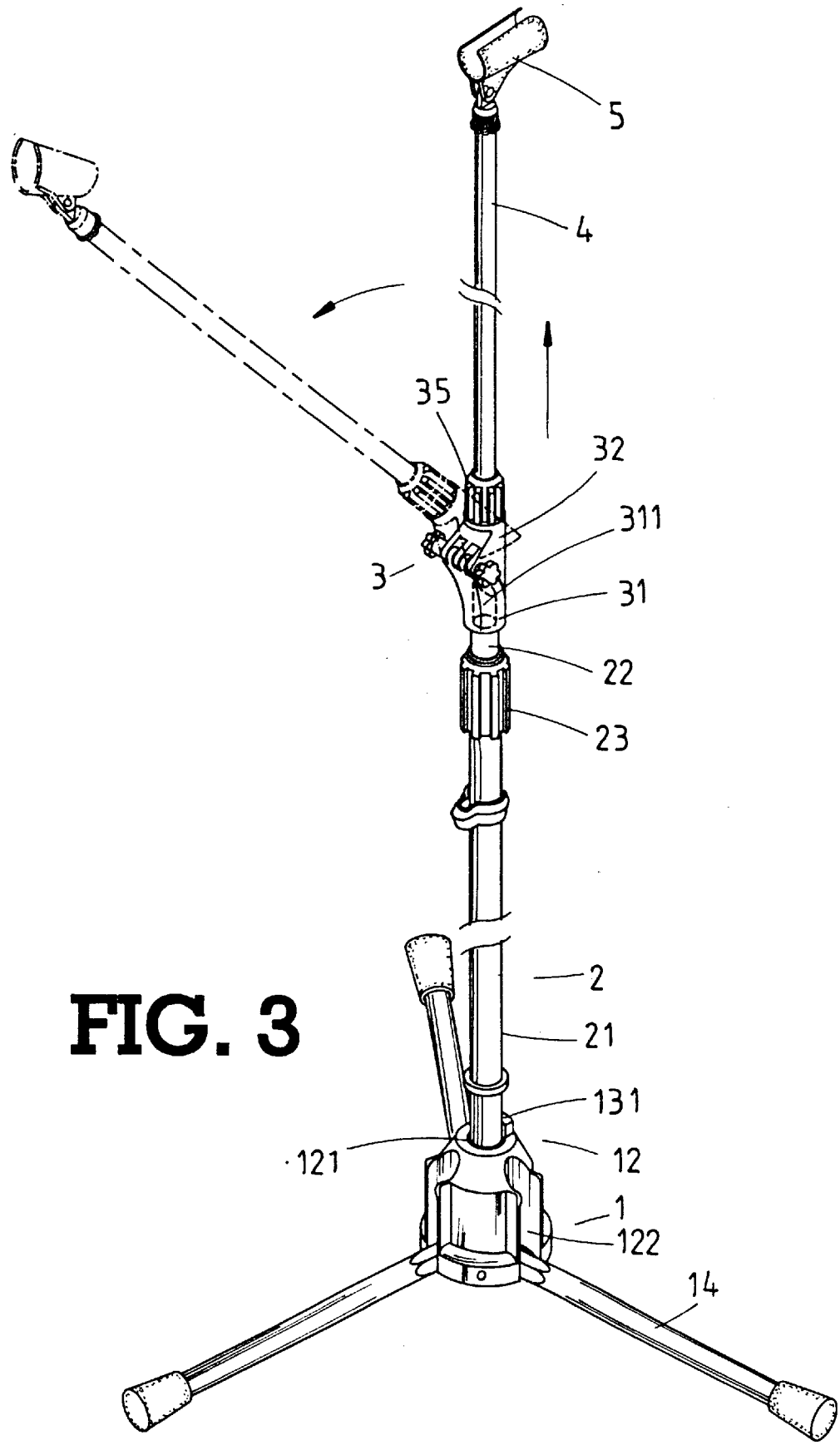
FIG. 3 is a perspective view of the microphone stand assembly in accordance with the present invention.

The microphone stand assembly in FIG. 3 is in an extended status, in which the lower end of holder rod 4 may be removed from the upper tube 22 such that the holder rod 4 may be pivoted to a desired inclined status (see the phantom lines) by means of adjusting the knob 34 and the pin 33. Referring to FIG. 4, the user may push the top end 131 of the actuating member 13 downwardly to cause the engaging sections 132 and 133 disengage from the guiding groove 1112. Then, the lower tube 21 is rotated such that the positioning bolt 213 is displaced to a place corresponding to the notch 1332 along the guiding groove 1112, in which the slanted surface 1321 (FIG. 2) guides the positioning bolt 213 to enter the notch 1322. In addition, the actuating member 13 is biased by the spring 135 to assure reliable engagement between the notch 1322 of the positioning bolt 213. Again, the end 142 of each leg 14 rests on the supporter 211 on the lower end of the post 2 to improve stability. In addition, the supporter 211 prevents from upward folding movements of the legs 14.

Figure 5:
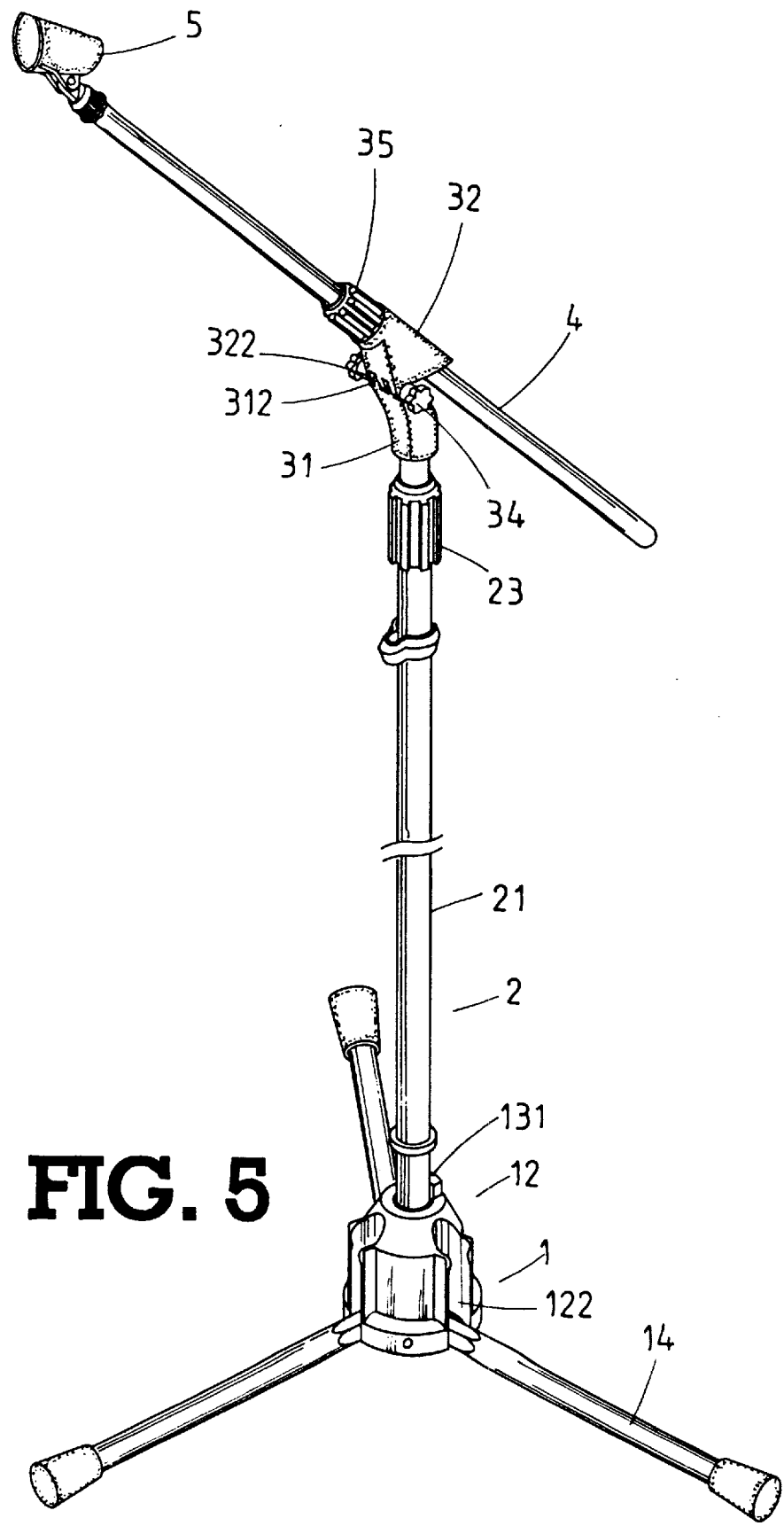
FIG. 5 is a perspective view illustrating use of the microphone stand assembly in accordance with the present invention.

Referring to FIG. 5, the holder rod 4 is secured to the upper end 324 of the connecting block 32 by the clamping sleeve 35 to determine the position of the holder rod 4. In addition, the angular position of the holder rod 4 relative to the seat 31 can be adjusted, as mentioned above (See the phantom lines in FIG. 3).

Figure 6:
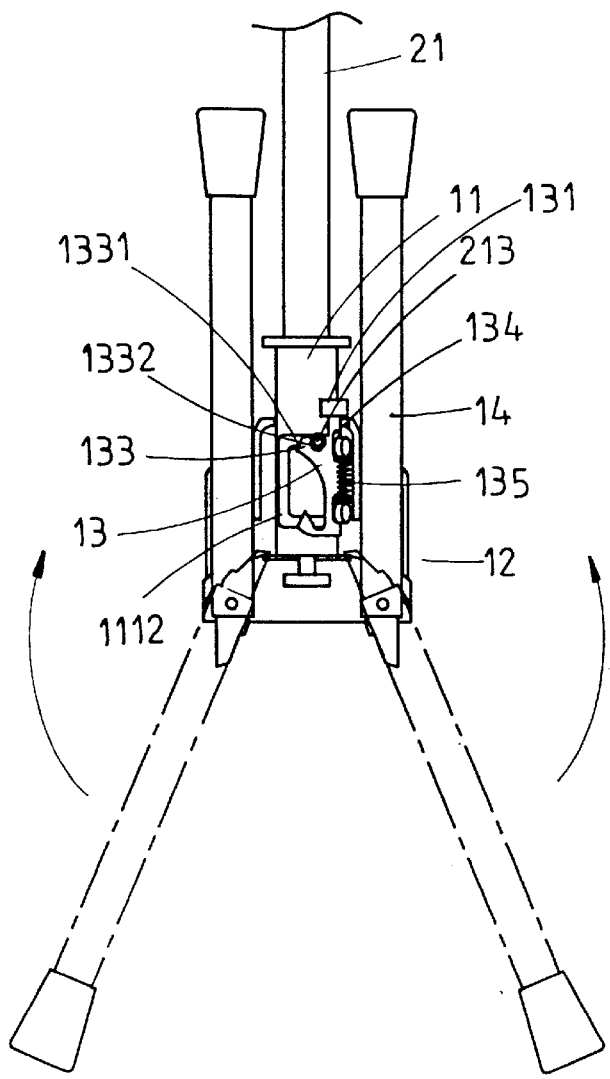
FIG. 6 is a schematic side view illustrating folding of the leg base.
Figure 7:
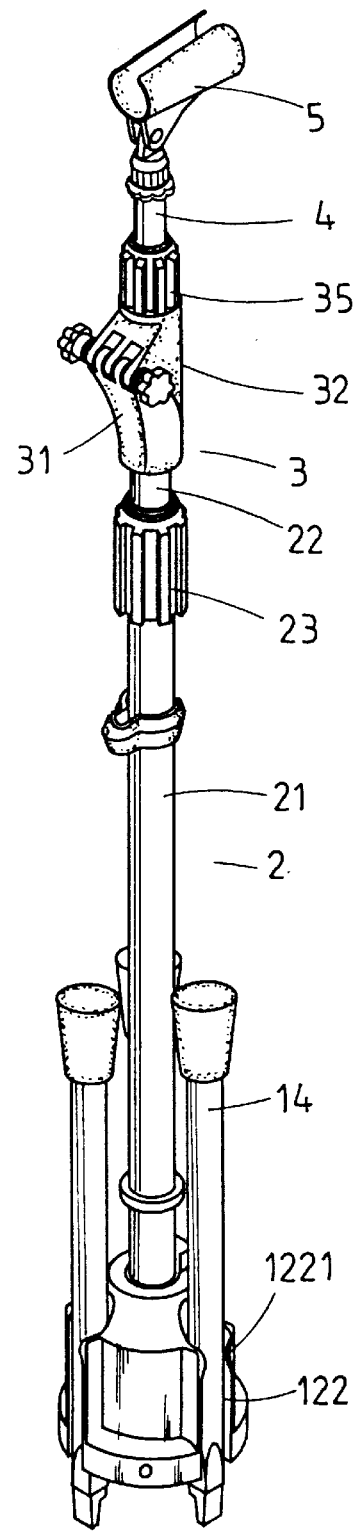
FIG. 7 is a perspective view of the folded microphone stand assembly in accordance with the present invention.
Figure 8:
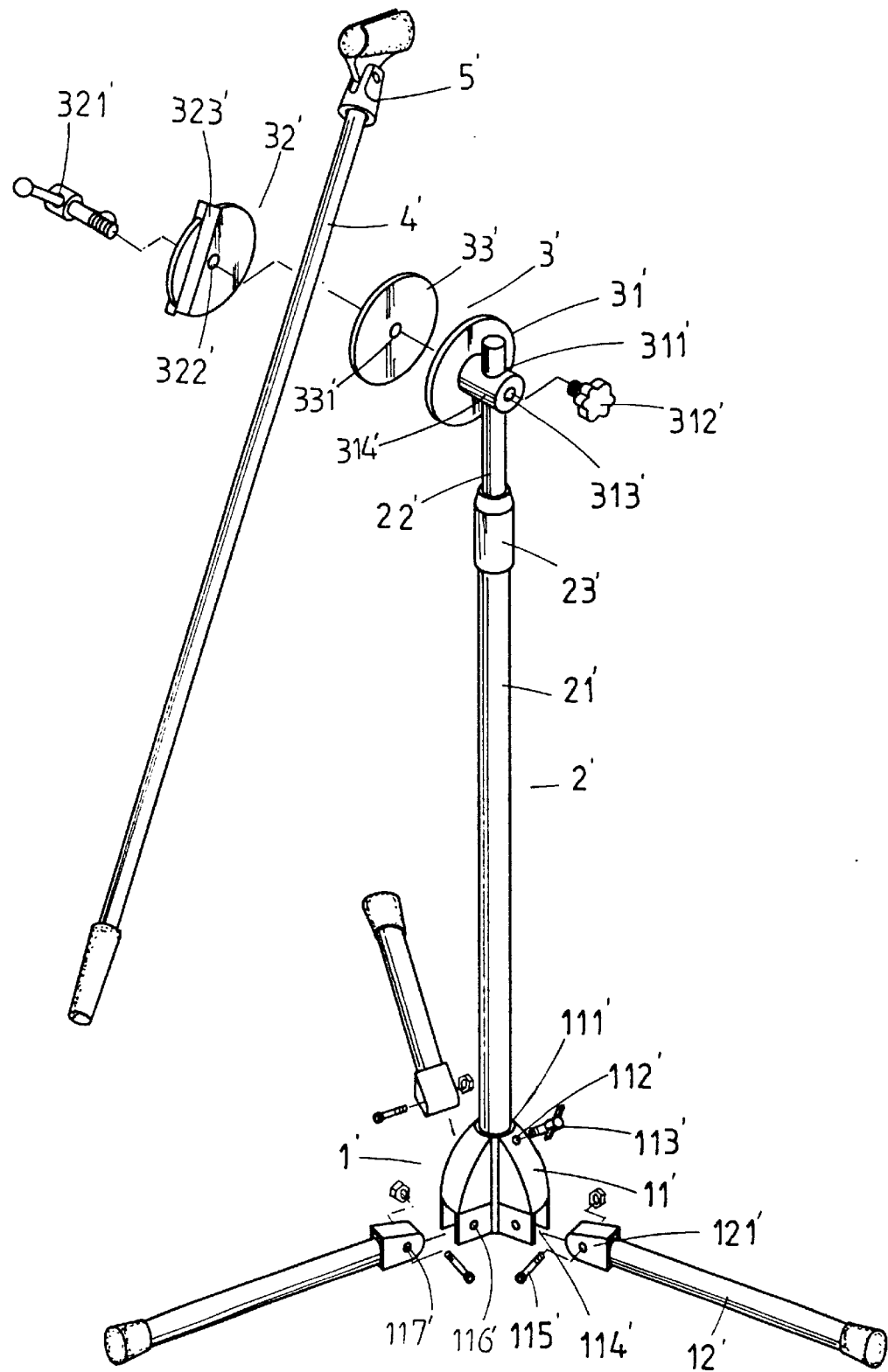
FIG. 8 is a exploded perspective view of a conventional microphone stand assembly.
Figure 9:
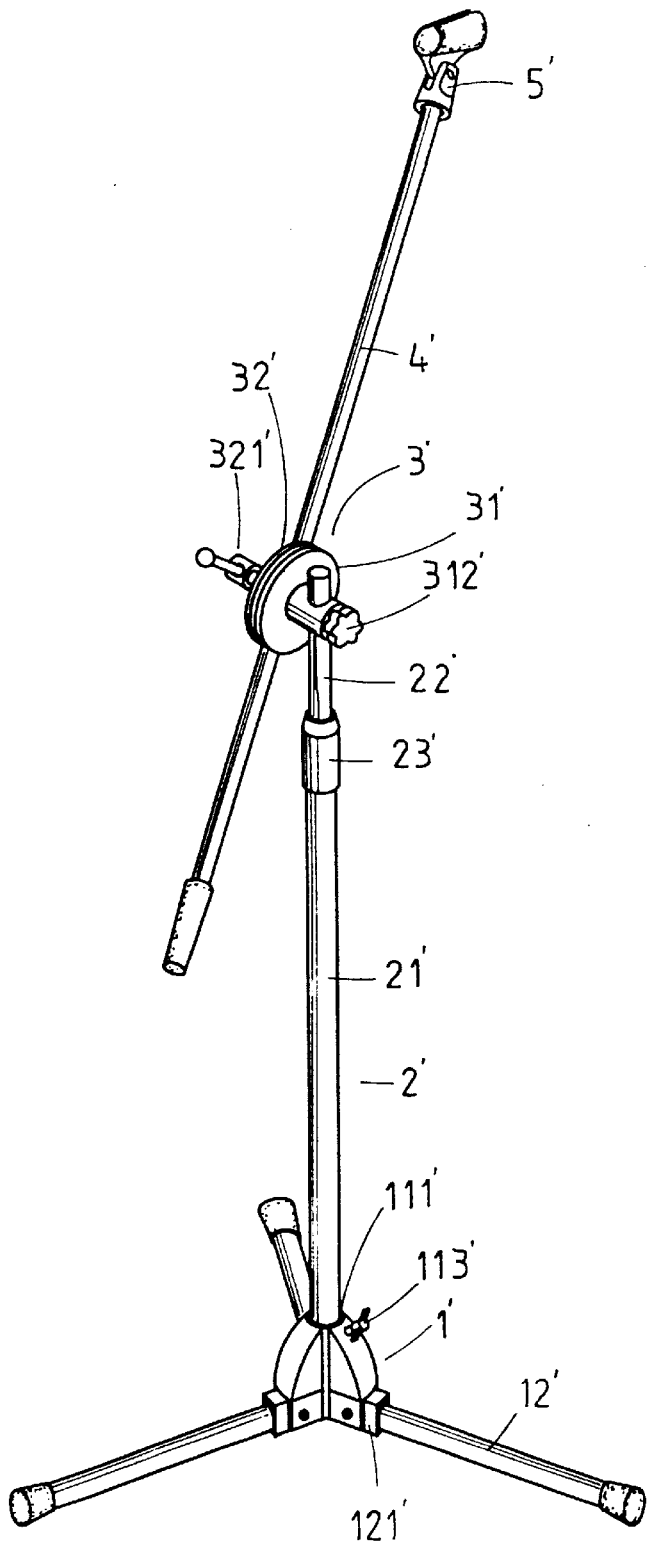
FIG. 9 is a perspective view of the conventional microphone stand assembly.
Figure 10:
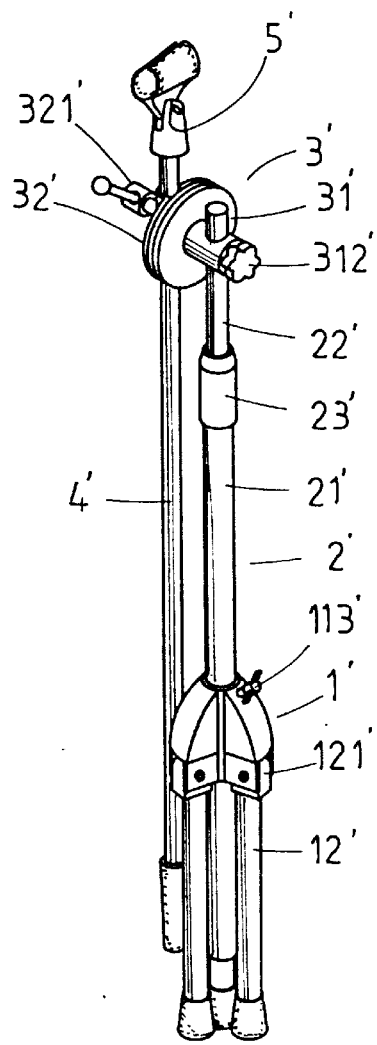
FIG. 10 is a perspective view of the conventional microphone stand assembly in a folded status.

Referring to FIG. 6, for folding of the legs 14, the top end 131 of the actuating member 13 is pressed to cause disengagement of the positioning bolt 213 from the notch 1322. Then, the lower tube 21 is rotated to make the positioning bolt 213 move to a place corresponding to the engaging section 133 along the guiding groove 1112 and enter the notch 1332. The spring 135 assures reliable engagement between the notch 1332 and the positioning bolt 213. The legs 14 are then folded upwardly and held in the channels 122, respectively. Each leg 14 is retained by the narrowed section 1221 of the associated channel 122. The lower end of holder rod 4 can be slid into the upper tube 22 to reduce the overall height of the stand assembly, best shown in FIG. 7.

According to the above description, it is appreciated that the microphone stand assembly in accordance with the present invention has many advantages. For example, the stability is improved as the holder rod 4 directly lies above the post 2, not the side of the post 2 when the microphone stand assembly is in an extended status. Further, the actuating member 13 and the positioning bolt 213 are provided to retain the leg base 1 and the post 2 in the assembled status. This further improves the stability of the leg base 1 and thus avoids loose connection in the conventional design. In addition, the inner ends 142 of the legs 14 rest on the supporter 211 on the lower end of the post 2 to further increase the stability. Furthermore, the holder rod 4 can be received in the post 2 to reduce the overall volume and overall height for convenient storage. Further, extension of the leg base 1 is achieved by simple operation of the actuating member 13, which is more convenient than rotation of knobs in the conventional design. Further, the leg base 1 is retained in position by the actuating member 13 and the positioning bolt 213 during holding, while the legs 14 are securely held in the channels 122 to improve stability during folding of the leg seat 1.

Although the invention has been explained in relation to its preferred embodiment, it is to be understood that many other possible modifications and variations can be made without departing from the spirit and scope of the invention as hereinafter claimed.

What is claimed is:

1. A microphone stand assembly, comprising:
   a leg base including a lower end and an upper end, a plurality of legs each having an end connected to the lower end of the leg base,
   a post including a lower tube having a lower end connected to the leg base, an upper tube slidably received in the lower tube, and a first clamping sleeve for holding the upper tube in place relative to the lower tube, the upper tube having an upper end,
   a pivotal base including:
     a seat secured to the upper end of the upper tube and including a first through hole therein, and
     a connecting block including a section pivotally connected to the seat, a second through hole, and an upper end,
   a holder rod slidably extended through the first through hole, the second through hole, and the upper tube in a first useable position, the holder rod being removable from the first through hole and the upper tube, and a second clamping sleeve being provided to hold the holder rod in place relative to the upper end of the connecting block in a second useable position, the holder rod further including an upper end, and
   a microphone holder secured to the upper end of the holder rod and wherein the first and second useable positions are angularly related to each other.

2. The microphone stand assembly as claimed in claim 1, wherein the leg base includes a plurality of channels defined in an outer periphery thereof, and each said leg is pivotally connected to the leg base and is releasably retained in an associated said channel when in a folded status.

3. The microphone stand assembly as claimed in claim 2, wherein each said channel includes a narrowed section for holding an associated said leg.

4. The microphone stand assembly as claimed in claim 2, wherein the lower tube of the post includes a supporter at the lower end thereof, and the end of each said leg that is pivotally connected to the leg base rests on the supporter.

5. The microphone stand assembly as claimed in claim 1, wherein the leg base includes a connecting seat and an engaging sleeve mounted around the connecting seat, the connecting seat having a guiding groove defined in an outer periphery thereof, the engaging sleeve including a central hole and a plurality of channels defined in an outer periphery thereof, an inner periphery that defines the central hole of the engaging sleeve including a vertical groove defined therein, the lower tube including a transverse screw hole defined in a lower end thereof, and further comprising a positioning bolt extended through the transverse screw hole and slidably guided in the guiding groove, and further comprising an actuating member slidably received in the vertical groove of the engaging sleeve, the actuating member including a top end extended beyond the vertical groove for manual push, the actuating member further including a first engaging section and a second engaging section, wherein the positioning bolt is engaged with the first engaging section when the legs are in an extended status, and wherein the positioning bolt is engaged with the second engaging section when the legs are in a folded status in which each said leg is retained in an associated said channel.

6. The microphone stand assembly as claimed in claim 5, wherein the first engaging section of the actuating member includes a notch for releasably engaging with the positioning bolt.

7. The microphone stand assembly as claimed in claim 6, wherein the first engaging section of the actuating member further includes a slanted surface adjacent to the notch for guiding the positioning bolt into the notch.

8. The microphone stand assembly as claimed in claim 5, wherein the second engaging section of the actuating member includes a notch for releasably engaging with the positioning bolt.

9. The microphone stand assembly as claimed in claim 8, wherein the second engaging section of the actuating member further includes a slanted surface adjacent to the notch for guiding the positioning bolt into the notch.

10. A microphone stand assembly, comprising:

a leg base including a connecting seat, an engaging sleeve mounted around the connecting seat, and a plurality of legs each having an end pivotally connected to the connecting seat, the connecting seat having a guiding groove defined in an outer periphery thereof, the engaging sleeve including a central hole and a plurality of channels defined in an outer periphery thereof, an inner periphery that defines the central hole of the engaging sleeve including a vertical groove defined therein, and further comprising an actuating member slidably received in the vertical groove of the engaging sleeve, the actuating member including a top end extended beyond the vertical groove for manual push, the actuating member further including a first engaging section and a second engaging section, a post including a lower tube having a lower end received in the connecting seat of the leg base, an upper tube slidably received in the lower tube, and a first clamping sleeve for holding the upper tube in place relative to the lower tube, the upper tube having an upper end, the lower tube including a transverse screw hole defined in the lower end thereof, and further comprising a positioning bolt extended through the transverse screw hole and slidably guided in the guiding groove, wherein the positioning bolt is engaged with the first engaging section when the legs are in an extended status, and wherein the positioning bolt is engaged with the second engaging section when the legs are in a folded status, a holder rod attached to the upper end of the upper tube, and a microphone holder secured to the upper end of the holder rod.

11. The microphone stand assembly as claimed in claim 10, wherein each said channel includes a narrowed section for holding an associated said leg.

12. The microphone stand assembly as claimed in claim 10, wherein the lower tube of the post includes a supporter at the lower end thereof, and the end of each said leg that is pivotally connected to the leg base rests on the supporter.

13. A microphone stand assembly, comprising:

a leg base including a lower end and an upper end, a plurality of legs each having an end connected to the lower end of the leg base, a post including a lower end connected to the leg base and an upper end a pivotal base including:
  a seat secured to the upper end of the post and including a first through hole therein, and
  a connecting block including a section pivotally connected to the seat, a second through hole, and an upper end, a holder rod slidably extended through the first through hole, the second through hole, and the post in a first useable position, the holder rod being removable from the first through hole and the upper tube, and a clamping sleeve being provided to hold the holder rod in place relative to the upper end of the connecting block in a second useable position, the holder rod further including an upper end, and a microphone holder secured to the upper end of the holder rod and wherein the first and second useable positions are angularly related to each other.

* * * * *